(12) United States Patent
Liu et al.

(10) Patent No.: US 11,272,451 B2
(45) Date of Patent: Mar. 8, 2022

(54) BASE STATION, USER EQUIPMENT, AND RELATED METHODS

(71) Applicants: SHARP KABUSHIKI KAISHA, Sakai (JP); FG INNOVATION COMPANY LIMITED, Tuen Mun (HK)

(72) Inventors: Renmao Liu, Shanghai (CN); Ningjuan Chang, Shanghai (CN); Chongming Zhang, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 183 days.

(21) Appl. No.: 16/633,089

(22) PCT Filed: Jul. 23, 2018

(86) PCT No.: PCT/CN2018/096596
§ 371 (c)(1),
(2) Date: Jan. 22, 2020

(87) PCT Pub. No.: WO2019/019960
PCT Pub. Date: Jan. 31, 2019

(65) Prior Publication Data
US 2021/0136687 A1   May 6, 2021

(30) Foreign Application Priority Data
Jul. 27, 2017   (CN) .......................... 201710626984.8

(51) Int. Cl.
*H04W 52/02* (2009.01)
*H04W 4/80* (2018.01)
(Continued)

(52) U.S. Cl.
CPC ......... *H04W 52/0229* (2013.01); *H04W 4/80* (2018.02); *H04W 68/005* (2013.01); *H04W 72/042* (2013.01); *H04W 72/0446* (2013.01)

(58) Field of Classification Search
USPC ....................................................... 370/318
See application file for complete search history.

(56) References Cited

U.S. PATENT DOCUMENTS

| 9,295,044 B2 | 3/2016 | Novak et al. |
| 9,603,065 B2 | 3/2017 | Nory et al. |

(Continued)

FOREIGN PATENT DOCUMENTS

| CN | 102036346 A | 4/2011 |
| CN | 104025679 A | 9/2014 |

(Continued)

OTHER PUBLICATIONS

3GPP TSG RAN WG1 Meeting #89 R1-1708072 May 2017 (Year: 2017).*

(Continued)

*Primary Examiner* — William Nealon
(74) *Attorney, Agent, or Firm* — ScienBiziP, P.C.

(57) ABSTRACT

The present disclosure provides a method used in user equipment (UE). The method comprises: determining a time-domain position of physical wake-up signaling, the physical wake-up signaling being used for waking up the UE to detect a subsequent narrowband physical downlink control channel (NPDCCH); and detecting the physical wake-up signaling from a base station at the determined time-domain position, wherein the determining a time-domain position comprises: determining a start subframe or an end subframe for the physical wake-up signaling and the number of subframes for the physical wake-up signaling.

12 Claims, 3 Drawing Sheets

(51) Int. Cl.
H04W 68/00 (2009.01)
H04W 72/04 (2009.01)

(56) References Cited

U.S. PATENT DOCUMENTS

| | | | |
|---|---|---|---|
| 2007/0008915 | A1 | 1/2007 | Kim et al. |
| 2013/0114484 | A1 | 5/2013 | Suzuki et al. |
| 2014/0211678 | A1* | 7/2014 | Jafarian ............ H04W 52/0229 370/311 |
| 2015/0173039 | A1 | 6/2015 | Rune et al. |
| 2016/0057738 | A1 | 2/2016 | Lee et al. |
| 2017/0332327 | A1* | 11/2017 | Fang ..................... H04W 16/14 |
| 2020/0029302 | A1* | 1/2020 | Cox ................... H04W 56/0015 |
| 2020/0059862 | A1* | 2/2020 | Wong ................... H04W 76/27 |
| 2020/0145921 | A1* | 5/2020 | Zhang ................... H04W 76/27 |

FOREIGN PATENT DOCUMENTS

| | | |
|---|---|---|
| CN | 104350795 A | 2/2015 |
| EP | 1734699 A2 | 12/2006 |
| WO | 2014/181981 A1 | 11/2014 |
| WO | 2016/072770 A1 | 5/2016 |

OTHER PUBLICATIONS

3GPP TSG RAN WG1 Meeting #89 R1-1707021 May 2017 (Year: 2017).*
3GPP TSG RAN WG1 Meeting #89 R1-1707319 May 2017 (Year: 2017).*
ETSI, "Technical Specification, LTE; Evolved Universal Terrestrial Radio Access (E-UTRA); User Equipment (UE) procedures in idle mode (3GPP TS 36.304 version 14.2.0 Release 14)", ETSI TS 136 304 V14.2.0 (Apr. 2017).
Huawei, HiSilicon, "On 'wake-up signal' for paging and connected-mode DRX", R1-1707021, 3GPP TSG RAN WG1 Meeting #89, Hangzhou, China, May 15-19, 2017.
"3rd Generation Partnership Project; Technical Specification Group Radio Access Network; Evolved Universal Terrestrial Radio Access (E-UTRA); Multiplexing and channel coding (Release 14)", 3GPP TS 36.212 V14.3.0 (Jun. 2017).
"3rd Generation Partnership Project; Technical Specification Group Radio Access Network; Evolved Universal Terrestrial Radio Access (E-UTRA); Physical channels and modulation (Release 14)", 3GPP TS 36.211 V14.3.0 (Jun. 2017).
Huawei et al., "New WID on Further NB-IoT enhancements", RP-170852, #3GPP TSG RAN Meeting #75 Dubrovnik, Croatia, Mar. 6-9, 2017.

* cited by examiner

BASE STATION, USER EQUIPMENT, AND RELATED METHODS

TECHNICAL FIELD

The present application relates to the field of wireless communications technologies. More specifically, the present application relates to a base station, user equipment, and methods therein related to physical wake-up signaling.

BACKGROUND

A new work item on further Narrowband Internet of Things (NB-IoT) enhancements (see non-patent literature: RP-170852: New WID on Further NB-IoT enhancements) was approved at the 3rd Generation Partnership Project (3GPP) RAN #75 plenary meeting held in March 2017. One of the objectives of the research project is to design physical signaling/a physical channel for paging messages in an idle state or discontinuous reception in a connected state, so that the physical signaling/channel can be efficiently decoded or detected before a narrowband physical downlink control channel (NPDCCH) and/or narrowband physical downlink shared channel (Narrowband Physical Downlink Shared Channel, NPDSCH) is decoded. It was agreed on the design of the physical signaling/channel at the 3GPP RAN1 #89 meeting held in May 2017, that physical signaling/a physical channel is to be designed for at least paging messages in an idle state to indicate to user equipment whether its subsequent physical channel needs to be decoded. There are several candidate signaling/channel design schemes as follows:

wake-up signaling or discontinuous transmission;
go-to-sleep signaling or discontinuous transmission;
wake-up signaling but no discontinuous transmission;
downlink control information.

Detailed design schemes need to be further studied. The present invention mainly solves the design of the aforementioned physical signaling/channel.

SUMMARY

According to a first aspect of the present invention, a method used in user equipment (UE) is provided, the method comprising: determining a time-domain position of physical wake-up signaling, the physical wake-up signaling being used for waking up the UE to detect a subsequent narrowband physical downlink control channel (NPDCCH); and detecting the physical wake-up signaling from a base station at the determined time-domain position, wherein the determining a time-domain position comprises: determining a start subframe or an end subframe for the physical wake-up signaling, and the number of subframes for the physical wake-up signaling.

In an embodiment, a first offset exists between the end subframe and a subsequent paging occasion, and the time-domain position comprises the number of consecutive available subframes ending with the end subframe; or a second offset exists between the start subframe and a subsequent paging occasion, and the time-domain position comprises the number of consecutive available subframes starting with the start subframe; or the start subframe is determined by a period of the physical wake-up signaling and a third offset, and the time-domain position comprises the number of consecutive available subframes starting with the start subframe, wherein the first offset, the second offset, the period, and the third offset are predetermined or configured by the base station through signaling, and the number is configured for a paging carrier by the base station through radio resource control (RRC) signaling, or derived according to a maximum number of repetitions, configured for a paging carrier, of an NPDCCH scrambled by a paging radio network temporary identity (P-RNTI).

In an embodiment, the determining a time-domain position further comprises: determining a start orthogonal frequency division multiplexing (OFDM) symbol for the physical wake-up signaling in each subframe for the physical wake-up signaling, wherein the start OFDM symbol is predefined or configured by the base station through signaling.

In an embodiment, the detecting the physical wake-up signaling comprises: detecting the physical wake-up signaling by using an orthogonal sequence associated with a user group to which the UE belongs, so that the UE decodes only physical wake-up signaling for the user group to which the UE belongs.

According to a second aspect of the present invention, user equipment (UE) is provided, comprising a transceiver, a processor, and a memory, the processor storing instructions executable by the processor so that the UE performs the method according to the above first aspect.

According to a third aspect of the present invention, a method used in a base station is provided, the method comprising: determining a time-domain position of physical wake-up signaling, the physical wake-up signaling being used for waking up user equipment (UE) to detect a subsequent narrowband physical downlink control channel (NPDCCH); and sending the physical wake-up signaling to the UE at the determined time-domain position, wherein the determining a time-domain position comprises: determining a start subframe or an end subframe for the physical wake-up signaling and the number of subframes for the physical wake-up signaling.

In an embodiment, a first offset exists between the end subframe and a subsequent paging occasion, and the time-domain position comprises the number of consecutive available subframes ending with the end subframe; or a second offset exists between the start subframe and a subsequent paging occasion, and the time-domain position comprises the number of consecutive available subframes starting with the start subframe; or the start subframe is determined by a period of the physical wake-up signaling and a third offset, and the time-domain position comprises the number of consecutive available subframes starting with the start subframe, wherein the first offset, the second offset, the period, and the third offset are predetermined or configured for the UE through signaling, and the number is configured for a paging carrier for the UE through radio resource control (RRC) signaling, or derived according to a maximum number of repetitions, configured for a paging carrier, of an NPDCCH scrambled by a paging radio network temporary identity (P-RNTI).

In an embodiment, the determining a time-domain position further comprises: determining a start orthogonal frequency division multiplexing (OFDM) symbol for the physical wake-up signaling in each subframe for the physical wake-up signaling, wherein the start OFDM symbol is predefined or configured for the UE through signaling.

In an embodiment, the sending the physical wake-up signaling comprises: applying an orthogonal sequence associated with a user group to which the UE belongs to the physical wake-up signaling.

According to a fourth aspect of the present invention, a base station is provided, comprising a transceiver, a processor, and a memory, the processor storing instructions executable by the processor so that the base station performs the method according to the above third aspect.

BRIEF DESCRIPTION OF THE DRAWINGS

The above and other features of the present application will become more apparent through the following detailed description made in conjunction with the accompanying drawings, where.

DETAILED DESCRIPTION

Figure 1:
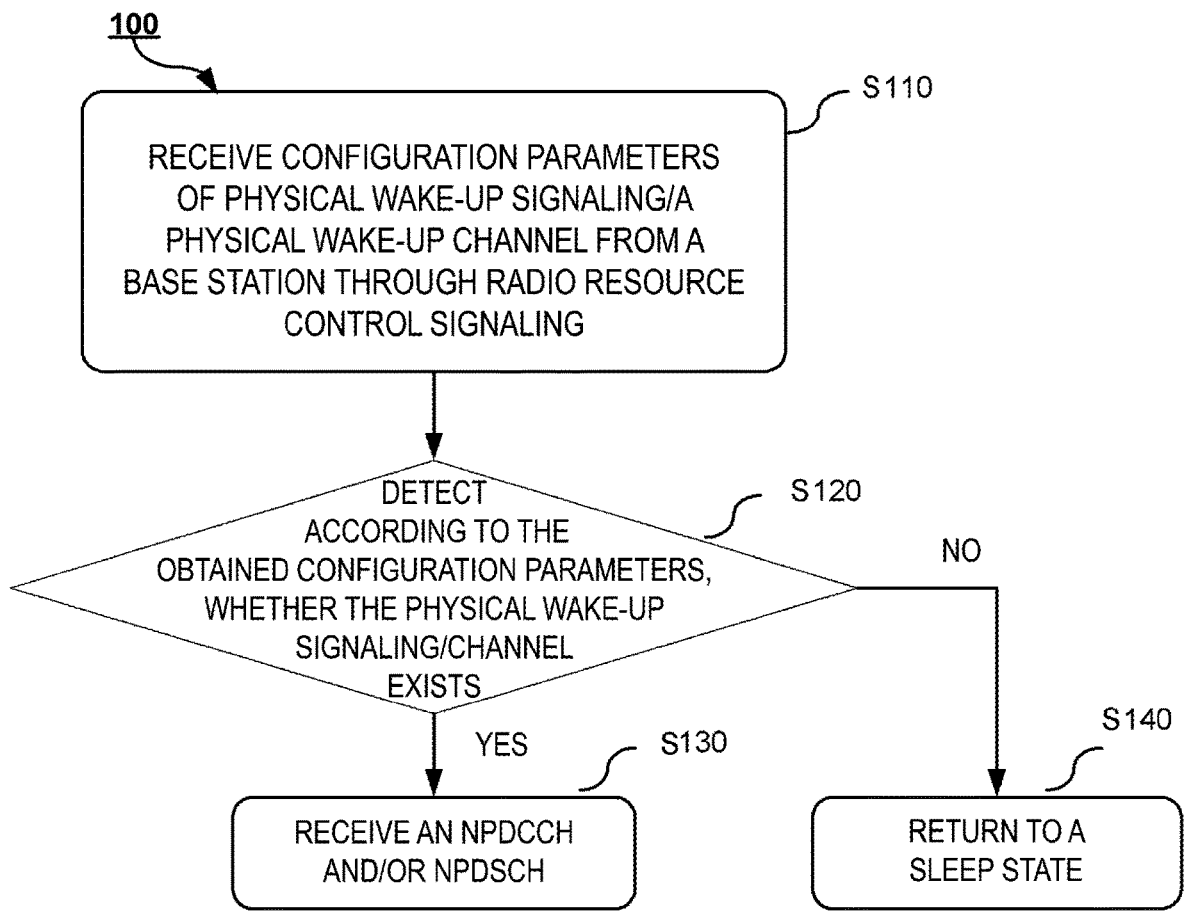
FIG. 1 is a flowchart of monitoring and processing physical wake-up signaling/a physical wake-up channel by the NB-IoT UE.

The following describes the present application in detail with reference to the accompanying drawings and specific embodiments. It should be noted that the present application should not be limited to the specific embodiments described below. In addition, for simplicity, detailed description of the known art not directly related to the present application is omitted to prevent confusion in understanding the present application.

The base station in the present invention is an entity for communicating with user equipment, and may also refer to a Node B or an evolved Node B (eNB) or an access point (AP).

The user equipment in the present invention may also refer to a terminal or an access terminal or a station or a mobile station or the like. The user equipment may be a cellular phone or a personal digital assistant (PDA) or a cordless telephone or a notebook computer or a mobile phone or a smart phone or a handheld device or a netbook or the like.

The physical downlink control channel in the present invention may refer to a PDCCH in 3GPP LTE/LTE-A (Long Term Evolution/Long Term Evolution-Advanced) or an MPDCCH (MTC PDCCH) for machine-type communications or an NPDCCH for narrowband Internet of Things communications or an NR-PDCCH for NR (New Radio, also referred to as 5G) or the like. The physical downlink shared channel may refer to a PDSCH in 3GPP LTE/LTE-A (Long Term Evolution/Long Term Evolution-Advanced) or an NPDSCH for narrowband Internet of Things communications or an NR-PDSCH or the like.

The physical signaling/channel in the present invention may refer to physical wake-up signaling (Wake Up Signaling, WUS)/a physical wake-up channel, or physical go-to-sleep signaling (Go-To-Sleep Signaling, GTS)/a physical go-to-sleep channel, or the like.

The physical wake-up signaling/channel refers to that UE in an idle state or UE with discontinuous reception (DRX) in an RRC connected state, which needs to detect or decode the physical wake-up signaling/channel before receiving or detecting or decoding a physical downlink control channel and/or physical downlink shared channel. If the physical wake-up signaling is detected or decoded, a subsequent physical downlink control channel and/or physical downlink shared channel is received or detected or decoded. Alternatively, the physical wake-up signaling/channel refers to that UE in an idle state or UE with discontinuous reception (DRX) in an RRC connected state, which needs to detect or decode the physical wake-up signaling/channel before receiving or detecting or decoding a physical downlink control channel and/or physical downlink shared channel. If the physical wake-up signaling/channel is detected or decoded, a subsequent physical downlink control channel and/or physical downlink shared channel is detected or decoded. If the physical wake-up signaling/channel is not detected or decoded, a subsequent physical downlink control channel and/or physical downlink shared channel is not detected or decoded. Or, the subsequent physical downlink control channel and/or physical downlink shared channel is ignored or skipped.

The physical go-to-sleep signaling/channel refers to that UE in an idle state or UE with discontinuous reception (DRX) in an RRC connected state needs to detect or decode the physical go-to-sleep signaling/channel before receiving or detecting or decoding a physical downlink control channel and/or physical downlink shared channel. If the physical go-to-sleep signaling/channel is detected or decoded, the UE does not detect or decode a subsequent physical downlink control channel and/or physical downlink shared channel, but directly enters a sleep state. Alternatively, the physical go-to-sleep signaling/channel refers to that UE in an idle state or UE with discontinuous reception (DRX) in an RRC connected state, which needs to detect or decode the physical go-to-sleep signaling/channel before receiving or detecting or decoding a physical downlink control channel and/or physical downlink shared channel. If the physical go-to-sleep signaling/channel is detected or decoded, a subsequent physical downlink control channel and/or physical downlink shared channel is not detected or decoded. If the physical wake-up signaling is not detected or decoded, a subsequent physical downlink control channel and/or physical downlink shared channel is received or detected or decoded.

In the existing 3GPP LTE/LTE-A, UE in an idle state may use discontinuous reception to reduce power consumption. A paging occasion (PO) is a subframe on which a PDCCH or an MPDCCH or an NPDCCH that is scrambled by a P-RNTI and schedules a paging message may exist. In the case of an MPDCCH scrambled by a P-RNTI, the PO refers to the starting subframe of MPDCCH repetitions. In the case of an NPDCCH scrambled by a P-RNTI, the PO refers to the starting subframe of NPDCCH repetitions unless the subframe determined by the PO is not a valid NB-IoT downlink subframe. When the subframe determined by the PO is not an valid NB-IoT downlink subframe, the first valid NB-IoT downlink subframe after the PO is the starting subframe of the NPDCCH repetitions.

A PF (Paging Frame) is a radio frame that may contain one or more POs. When DRX is used, the UE needs to monitor only one PO in each DRX cycle.

A PNB (Paging Narrowband) is a narrowband on which the UE receives a paging message.

The PF, PO, and PNB are determined by following formulae using the DRX parameters provided in system information:

The PF is given by the following equation:

$$\text{SFN mod } T = (T \text{ div } N)*(\text{UE\_ID mod } N) \qquad (1)$$

The PO may be obtained by looking up Table 1, Table 2, Table 3, or Table 4 using an index i_s according to a duplex mode and a system bandwidth. The i_s is obtained through the following equation:

$$i\_s = \text{floor}(\text{UE\_ID}/N) \bmod Ns \qquad (2)$$

TABLE 1

(when a PDCCH or an NPDCCH is scrambled by a P-RNTI
or an MPDCCH is scrambled by a P-RNTI
and the system bandwidth is greater than 3 MHz)

| Ns | PO, i_s = 0 | PO, i_s = 1 | PO, i_s = 2 | PO, i_s = 3 |
|----|-------------|-------------|-------------|-------------|
| 1  | 9           | N/A         | N/A         | N/A         |
| 2  | 4           | 9           | N/A         | N/A         |
| 4  | 0           | 4           | 5           | 9           |

TABLE 2

(an MPDCCH is scrambled by a P-RNTI and the system
bandwidth is 1.4 MHz and 3 MHz)

| Ns | PO, i_s = 0 | PO, i_s = 1 | PO, i_s = 2 | PO, i_s = 3 |
|----|-------------|-------------|-------------|-------------|
| 1  | 5           | N/A         | N/A         | N/A         |
| 2  | 5           | 5           | N/A         | N/A         |
| 4  | 5           | 5           | 5           | 5           |

For TDD (all uplink/downlink configurations):

TABLE 3

(when a PDCCH is scrambled by a P-RNTI or an MPDCCH
is scrambled by a P-RNTI and the system
bandwidth is greater than 3 MHz)

| Ns | PO, i_s = 0 | PO, i_s = 1 | PO, i_s = 2 | PO, i_s = 3 |
|----|-------------|-------------|-------------|-------------|
| 1  | 0           | N/A         | N/A         | N/A         |
| 2  | 0           | 5           | N/A         | N/A         |
| 4  | 0           | 1           | 5           | 6           |

TABLE 4

(an MPDCCH is scrambled by a P-RNTI and the system
bandwidth is 1.4 MHz and 3 MHz)

| Ns | PO, i_s = 0 | PO, i_s = 1 | PO, i_s = 2 | PO, i_s = 3 |
|----|-------------|-------------|-------------|-------------|
| 1  | 1           | N/A         | N/A         | N/A         |
| 2  | 1           | 6           | N/A         | N/A         |
| 4  | 1           | 1           | 6           | 6           |

If the detected MPDCCH is scrambled by the P-RNTI, the paging narrowband (PNB) is determined by the following equation:

$$PNB = \text{floor}(UE\_ID/(N*Ns)) \bmod Nn \quad (3)$$

If the detected NPDCCH is scrambled by the P-RNTI and the UE supports reception of a paging message on a non-anchor carrier, and configuration information of the paging message is provided for the non-anchor carrier in the system information, the paging carrier is determined by a minimum paging carrier n satisfying the following equation (4):

$$\text{floor}(UE\_ID/(N*Ns)) \bmod \Sigma_{j=0}^{j=(maxPagingCarriers-1)} \text{Weight}[j] < \Sigma_{k=0}^{k=(n-1)} \text{Weight}[k] \quad (4)$$

Each time the DRX parameters in the system information change, the DRX parameters in the system information stored in the UE need to be updated locally in the UE. If the UE does not have an international mobile subscriber identity (IMSI), for example, the UE does not have a universal subscriber identity module (Universal Subscriber Identity Module, USIM) and needs to initiate an emergency call, the UE needs to use a default identity UE_ID=0 in the above PF, i_s, and PNB equations.

The following parameters are used to calculate the paging carrier for the PF, i_s, PNB, and NB-IoT:

T: a DRX cycle of the UE. Except for NB-IoT, if a high layer configures a UE-specific extended DRX value as 512 radio frames, T=512. Otherwise, T is determined by the shortest DRX cycle in a UE-specific DRX cycle (if configured by the high layer) and a default DRX cycle broadcast in the system information. If the high layer does not configure the UE-specific DRX cycle, the default DRX cycle is used. The UE-specific DRX cycle does not apply to NB-IoT.

N: min(T, nB)

Ns: max(1, nB/T)

Nn: the number of paging narrowbands provided in the system information

UE_ID: IMSI mod 1024, if a P-RNTI is used to scramble a PDCCH; IMSI mod 4096, if a P-RNTI is used to scramble an NPDCCH; IMSI mod 16384, if a P-RNTI is used to scramble an MPDCCH or a P-RNTI is used to scramble an NPDCCH and the UE supports reception of a paging message on a non-anchor carrier, and if configuration information of the paging message is provided for the non-anchor carrier in the system information.

maxPagingCarriers: the number of configured paging carriers provided in the system information Weight(i): the weight of the ith paging carrier of NB-IoT The IMSI is a series of decimal digits (0-9). The IMSI in the equation is interpreted as a decimal integer in which the first digit is the highest-order digit, and so on. For example, IMSI=12 (digit 1=1, digit 2=2); in calculation, the IMSI is interpreted as a decimal number "12" rather than "1*16+2=18."

In the existing 3GPP LTE/LTE-A, for UE in an idle state, power consumption of the UE can be reduced by using a paging mechanism. However, when the UE is in a poor channel state and requires coverage enhancement, a PDCCH and/or PDSCH needs to be repeatedly transmitted so as to correctly receive information from a base station or correctly send information to a base station. When the UE needs to detect a paging message, the UE needs to be woken up from a sleep state to detect on each PO whether a paging message of the UE exists. However, the UE does not have any paging message most of the time. In this way, when the UE is in a coverage enhanced state, the UE needs to receive a PDCCH or PDSCH repeatedly many times so as to detect whether a paging message of the UE exists, and the UE does not have its own paging message most of the time. As a result, great power consumption of the UE is caused. For an MTC or NB-IoT user, it is extremely important to reduce power consumption of the UE. Thus, for UE in an idle state, physical signaling/a physical channel may be designed before a paging message is detected on each PO. For example, the physical signaling/channel is physical wake-up signaling/a physical wake-up channel. If the UE detects the physical wake-up signaling/channel, the UE detects a paging message on a subsequent PO, that is, detects a PDCCH (or MPDCCH or NPDCCH) scrambled by a P-RNTI and receives a PDSCH (or NPDCCH) scheduled by the PDCCH (or MPDCCH or NPDCCH). If the UE does not detect the physical wake-up signaling/channel, the UE does not detect a paging message on a subsequent PO, but directly returns to a sleep state.

Alternatively, the designed physical signaling/channel is physical go-to-sleep signaling/a physical go-to-sleep channel. If the UE detects the physical go-to-sleep signaling/channel, the UE does not detect a paging message on a subsequent PO, that is, not detect a PDCCH (or MPDCCH or NPDCCH) scrambled by a P-RNTI. If the UE does not detect the physical go-to-sleep signaling/channel, the UE detects a paging message on a subsequent PO, that is, detects a PDCCH (or MPDCCH or NPDCCH) scrambled by a P-RNTI and receives a PDSCH (or NPDSCH) scheduled by the PDCCH (or MPDCCH or NPDCCH).

Description is given below by using physical wake-up signaling/a physical wake-up channel as an example. The described technology is also applicable to physical go-to-sleep signaling/a physical go-to-sleep channel. Moreover, description is given by using NB-IoT as an object, and the described technology is also applicable to MTC, 3GPP LTE/LTE-A, and NR (New Radio, or referred to as 5th Generation Mobile Communications Technology).

FIG. 1 illustrates a process of monitoring and processing physical wake-up signaling/a physical wake-up channel by the NB-IoT UE. The NB-IoT UE receives configuration parameters of physical wake-up signaling/a physical wake-up channel from a base station through radio resource control signaling in step S110, and detects whether the physical wake-up signaling/channel exists according to the obtained configuration parameters in step S120. If the physical wake-up signaling/channel is detected, perform step S130, that is, receive a subsequent NPDCCH and/or NPDSCH of a paging message. If the physical wake-up signaling/channel is not detected, perform step S140, that is, ignore a subsequent NPDCCH and/or NPDSCH of a paging message, and enter a sleep state.

In the Rel-13 NB-IoT specifications, NB-IoT primary synchronization signaling (NB-IoT Primary synchronization signal, NPSS) uses a frequency-domain Zadoff-Chu sequence having a length of 11; in the frequency domain, the NPSS is mapped to 11 subcarriers on one NB-IoT narrowband carrier or one physical resource block (PRB). In the time domain, the NPSS occupies the last 11 OFDM symbols on one subframe, and are mapped to the 11 OFDM symbols using a code cover sequence [1 1 1 −1 −1 1 1 1 −1 1] and using the same Zadoff-Chu sequence. NB-IoT secondary synchronization signaling (NB-IoT secondary synchronization signal, NSSS) consists of a frequency-domain Zadoff-Chu sequence having a length of 131 and a binary scrambling sequence. The binary scrambling sequence uses a Hadamard sequence. In the frequency domain, the NSSS is mapped to 12 subcarriers on one NB-IoT narrowband carrier or one physical resource block (PRB). In the time domain, the NSSS occupies the last 11 OFDM symbols on one subframe. For specific details of the NPSS and NSSS, reference may be made to the non-patent literature 3GPP TS 36.211 V14.3.0 (2017-06).

The existing NB-IoT supports 20 dB coverage enhancement, and for UE requiring 20 dB coverage enhancement, an NPSS or NSSS needs to be repeatedly received about 20 times to detect the NPSS or NSSS. Sequence design and/or resource mapping methods similar to those of the NPSS or NSSS can be applied to the design of physical wake-up signaling/a physical wake-up channel. Thus, for UE requiring 20 dB coverage enhancement, physical wake-up signaling/a physical wake-up channel needs to be repeatedly received at least 20 times to detect the physical wake-up signaling/channel. For UE of different coverage enhancement levels, a set of values of the number of repetitions may be defined for physical wake-up signaling/a physical wake-up channel. That is, different coverage levels, for example, 6 levels {r1, r2, r4, r8, r16, r32}, are defined for the physical wake-up signaling/channel, that is, 6 values of the number of repetitions exist. The base station may configure the number of repetitions or repetition level of the physical wake-up signaling/channel through system information or UE-specific RRC signaling or MAC signaling or physical layer signaling.

In the 3GPP Rel-14 NB-IoT specifications, NB IoT carriers are divided into anchor carriers and non-anchor carriers. The UE can receive from anchor carriers data related to NB-IoT, such as a physical broadcast channel (NB-PBCH), a primary synchronization signal (NPSS)/secondary synchronization signal (NSSS), or a system information block (SIB), but can only receive from non-anchor carriers or send to non-anchor carriers data for unicast transmission related to NB-IoT, such as a physical downlink control channel (PDCCH), a physical downlink shared channel (PDSCH), or a physical uplink shared channel (PUSCH). When the base station does not configure non-anchor carriers for the UE, anchor carriers may also be used by the user equipment to receive or send NB-IoT related data for unicast transmission, such as a PDCCH, a PDSCH, or a PUSCH. The base station may configure non-anchor carriers for the user equipment through an RRC connection establishment message, an RRC connection reestablishment message, an RRC reconfiguration message, an RRC resume message, or the like.

In 3GPP Rel-14, NB-IoT supports reception of paging information on anchor carriers and/or non-anchor carriers by the UE. That is, in addition to the anchor carriers, the base station may configure multiple non-anchor carriers that can be used for paging message reception. A carrier or narrowband PNB for receiving a paging message by the UE is obtained from the above equation (3). For physical wake-up signaling/channels, a carrier where physical wake-up signaling/a physical wake-up channel to be detected by the UE is located is the same as the carrier for receiving a paging message by the UE, that is, the UE detects physical wake-up signaling/a physical wake-up channel and/or receives a paging message on the same carrier. The receiving a paging message is detecting an NPDCCH scrambled by a P-RNTI and receiving an NPDSCH that is scheduled by the NPDCCD and carries a paging message. The number of repetitions of physical wake-up signaling/a physical wake-up channel may be configured for each carrier (including an anchor carrier and a non-anchor carrier) that can be used for paging message reception. For example, in the NB-IoT system information block type 22 of 3GPP TS 36.331, the following configuration information of physical wake-up signaling/a physical wake-up channel is added, which may be configuring the number of repetitions of physical wake-up signaling/a physical wake-up channel for a non-anchor carrier of each paging message of NB-IoT.

SystemInformationBlockType22-NB information element

```
SystemInformationBlockType22-NB-r14 ::=  SEQUENCE {
    dl-CarrierConfigList-r14            DL-CarrierConfigCommonList-NB-r14    OPTIONAL, -- Need OR
    ul-CarrierConfigList-r14            UL-CarrierConfigCommonList-NB-r14    OPTIONAL, -- Need OR
    pcch-MultiCarrierConfig-r14    PCCH-MultiCarrierConfig-NB-r14         OPTIONAL, -- Need OR
    nprach-MultiCarrierConfig-r14   NPRACH-MultiCarrierConfig-NB-r14       OPTIONAL, -- Need OR
    lateNonCriticalExtension       OCTET STRING                           OPTIONAL,
    ...
}
```

-continued

```
SystemInformationBlockType22-NB information element

DL-CarrierConfigCommonList-NB-r14 ::=   SEQUENCE (SIZE (1 .. maxNonAnchorCarriers-NB-r14)) OF
                                            DL-CarrierConfigCommon-NB-r14
UL-CarrierConfigCommonList-NB-r14 ::=   SEQUENCE (SIZE ( 1 .. maxNonAnchorCarriers-NB-r14)) OF
                                            UL-CarrierConfigCommon-NB-r14
PCCH-MultiCarrierConfig-NB-r14 ::=      SEQUENCE {
    SystemInformationBlockType22-NB-r14 ::=    SEQUENCE {
        dl-CarrierConfigList-r14         DL-CarrierConfigCommonList-NB-r14    OPTIONAL -- Need OR
        ul-CarrierConfigList-r14         UL-CarrierConfigCommonList-NB-r14    OPTIONAL, -- Need OR
        pcch-MultiCarrierConfig-r14      PCCH-MultiCarrierConfig-NB-r14       OPTIONAL, -- Need OR
        nprach-MultiCarrierConfig-r14    NPRACH-MultiCarrierConfig-NB-r14     OPTIONAL, -- Need OR
        lateNonCriticalExtension         OCTET STRING                         OPTIONAL,
        ...
    }
    DL-CarrierConfigCommonList-NB-r14 ::=    SEQUENCE (SIZE (1 .. maxNonAnchorCarriers-NB-r14)) OF
                                                 DL-CarrierConfigCommonList-NB-r14
    UL-CarrierConfigCommonList-NB-r14 ::=    SEQUENCE (SIZE (1 .. maxNonAnchorCarriers-NB-r14)) OF
                                                 UL-CarrierConfigCommonList-NB-r14 ::=
    PCCH-MultiCarrierConfig-NB-r14 ::=       SEQUENCE {
IP80211
        pcch-ConfigList-r14              PCCH-ConfigList-NB-r14,
        pagingWeightAnchor-r14           PagingWeight-NB-r14                OPTIONAL, -- Need OP
        ...
}
PCCH-ConfigList-NB-r14 ::=              SEQUENCE (SIZE (1 .. maxNonAnchorCarriers-NB-r14)) OF
                                            PCCH-Config-NB-r14
PCCH-ConfigList-NB-r14 ::=              SEQUENCE {
    pcch-Config-r14                     SEQUENCE {
        npdcch-NumRepetitionPaging-r14      ENUMERATED {
                                                r1, r2, r4, r8, r16, r32, r64, r128,
                                                r256, r512, r1024, r2048,
                                                spare4, spare3, spare2, spare1} OPTIONAL, -- Need
OP
        WUS-NumberRepetition-r15            ENUMERATED {
                                                r1, r2, r4, r8, r16, r32, spare2, spare1} OPTIONAL,
-- Need OP
        pagingWeight-r14                 PagingWeight-NB-r14    DEFAULT w1.
        ...
    }  OPTIONAL    -- Need OR
}
PagingWeight-NB-r14     ::=            ENUMERATED {w1, w2, w3, w4, w5, w6, w7, w8,
                                           w9, w10, w11, w12, w13, w14, w15, w16}
```

In the NB-IoT system information type 2, the number of repetitions of physical wake-up signaling/a physical wake-up channel may be configured for an anchor carrier of NB-IoT. Alternatively, the number of repetitions of physical wake-up signaling/a physical wake-up channel may be configured in a unified manner for all carriers (including anchor carriers and non-anchor carriers) that can be used for paging message reception.

Alternatively, the physical wake-up signaling/channel may be obtained implicitly from the configured maximum number of repetitions of an NPDCCH of a paging message. In the existing NB-IoT, the maximum number of repetitions of an NPDCCH is configured for the NPDCCH scrambled by a P-RNTI on each paging carrier, which has 12 optional values {r1, r2, r4, r8, r6, r32, r64, r128, r256, r512, r1024, r2048}, R1 represents that the maximum number of repetitions is 1, R2 represents that the maximum number of repetitions is 2, . . . . A corresponding mapping relationship can be established between the number of repetitions of physical wake-up signaling/a physical wake-up channel on each paging carrier and the maximum number of repetitions of an NPDCCH of a paging message, so that the number of repetitions of physical wake-up signaling/a physical wake-up channel on each paging carrier can be obtained implicitly from the configured maximum number of repetitions of an NPDCCH of a paging message on the carrier. For example, the maximum number of repetitions of an NPDCCH of a paging message on each paging carrier has 12 configurable values {r1, r2, r4, r8, r16, r32, r64, r128, r256, r512, r1024, r2048}, while the number of repetitions of physical wake-up signaling/a physical wake-up channel has 6 configurable values {r1, r2, r4, r8, r16, r32}.

The following mapping relationship may be established:
r1, r2 of the NPDCCH of the paging message→r1 of the physical wake-up signaling/channel
r4, r8 of the NPDCCH of the paging message→r2 of the physical wake-up signaling/channel
r16, r32 of the NPDCCH of the paging message→r4 of the physical wake-up signaling/channel
r64, r128 of the NPDCCH of the paging message→r8 of the physical wake-up signaling/channel
r256, r512 of the NPDCCH of the paging message→r16 of the physical wake-up signaling/channel
r1024, r2048 of the NPDCCH of the paging message→r32 of the physical wake-up signaling/channel Embodiments of the present disclosure are described below with reference to the accompanying drawings.

Figure 2:
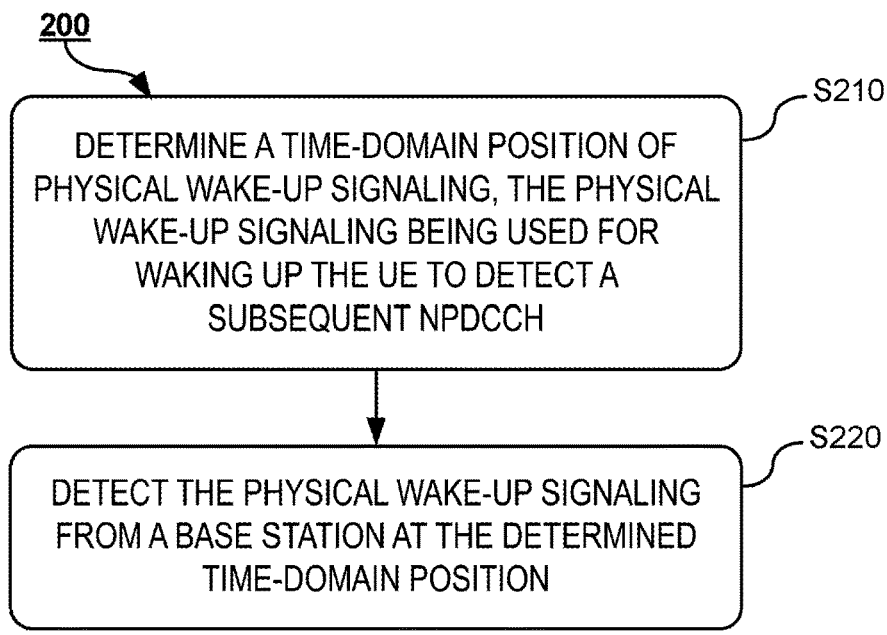
FIG. 2 is a flowchart of a method used in user equipment according to an embodiment of the present disclosure.

FIG. 2 is a flowchart of a method 200 used in user equipment (UE) according to an embodiment of the present disclosure. The method 200 include the following steps.

Step S210: Determine a time-domain position of physical wake-up signaling, the physical wake-up signaling being used for waking up the UE to detect a subsequent narrow-band physical downlink control channel (NPDCCH). In step S210, the determining a time-domain position includes: determining a start subframe or an end subframe for the physical wake-up signaling and the number of subframes for the physical wake-up signaling.

Step S220: Detect the physical wake-up signaling from a base station at the determined time-domain position.

In one example, a first offset exists between the end subframe and a subsequent paging occasion, and the time-domain position includes the number of consecutive available subframes ending with the end subframe. The first offset may be predetermined or configured by the base station through signaling. The number may be configured for a paging carrier by the base station through radio resource control (RRC) signaling, or derived according to a maximum number of repetitions, configured for a paging carrier, of an NPDCCH scrambled by a paging radio network temporary identity (P-RNTI).

Specifically, the last subframe of physical wake-up signaling/a physical wake-up channel on a specific paging carrier is located on the kth subframe prior to a paging occasion (PO). The k may be 1 or other fixed values or may be configured through system information or UE-specific RRC signaling or MAC signaling or physical layer signaling. The kth subframe is an available downlink subframe of the carrier of the paging message, and if the kth subframe is not an available downlink subframe, an available downlink subframe needs to be looked for forward. $M_{REP}^{WUP}$ ↑ consecutive available downlink subframes are looked for forward as subframes for carrying the physical wake-up signaling/channel by using the kth subframe prior to the paging occasion (PO) as the last subframe of the physical wake-up signaling/channel according to the configured number $M_{REP'}^{WUP}$ of repetitions of the physical wake-up signaling/channel on the carrier of the paging message.

It should be noted here that in the context of the present disclosure, an unavailable subframe may or may not exist between "consecutive" available subframes.

In another example, a second offset exists between the start subframe and a subsequent paging occasion, and the time-domain position includes the number of consecutive available subframes starting with the start subframe. The second offset may be predetermined or configured by the base station through signaling. The number may be configured for a paging carrier by the base station through radio resource control (RRC) signaling, or derived according to a maximum number of repetitions, configured for a paging carrier, of an NPDCCH scrambled by a paging radio network temporary identity (P-RNTI).

Specifically, an offset M is configured for physical wake-up signaling/a physical wake-up channel on each paging carrier. The offset M is in the unit of subframes, and M subframes are counted forward using a paging occasion (PO) as a reference point. The offset, M subframes, may include only available downlink subframes on the paging carrier, or may include all downlink subframes. The offset M may be configured through system information or UE-specific RRC signaling or MAC signaling or physical layer signaling, or may be obtained implicitly from other parameters. For example, the offset M of the physical wake-up signaling/channel from the paging occasion (PO) may be obtained implicitly through the configured number of repetitions of the physical wake-up signaling/channel on the paging carrier.

In another example, the start subframe is determined by a period of the physical wake-up signaling and a third offset, and the time-domain position includes the number of consecutive available subframes starting with the start subframe. The third offset may be predetermined or configured by the base station through signaling. The number may be configured for a paging carrier by the base station through radio resource control (RRC) signaling, or derived according to a maximum number of repetitions, configured for a paging carrier, of an NPDCCH scrambled by a paging radio network temporary identity (P-RNTI).

Specifically, a period $WUS_{pd}$ and/or an offset $WUS_{startoffset}$ may be configured for physical wake-up signaling/a physical wake-up channel on each paging carrier, where $WUS_{pd}$ and $WUS_{offset}$ are in the unit of subframes. The offset $WUS_{offset}$ may have a value of 0. A start subframe of the physical wake-up signaling/channel is determined according to the following equation:

$$(10*n_f+n_{sf}-WUS_{offset}) \bmod (WUS_{pd})=0 \qquad (5)$$

where $n_f$ is a system frame number, and has a value ranging from 0 to 1023 in 3GPP LTE Rel-8. The $n_{sf}$ is a subframe index number in a radio frame and has a value ranging from 0 to 9. A start subframe number of the physical wake-up signaling/channel can be obtained from equation (5) according to the period and the offset configured for the configured physical wake-up signaling/channel. Then, specific downlink subframes carrying the physical wake-up signaling/channel can be obtained according to the configured number of repetitions of the physical wake-up signaling/channel.

In order to further reduce the power consumption of the UE, a discontinuous transmission (DTX) mode may be configured for physical wake-up signaling/channels. That is, a discontinuous transmission period P is configured separately for physical wake-up signaling/a physical wake-up channel on each paging carrier. Alternatively, a discontinuous transmission period P may be configured collectively for physical wake-up signaling/channels on all paging carriers. The discontinuous transmission period P may be in the unit of paging periods or subframes or timeslots. If the UE detects physical wake-up signaling/a physical wake-up channel at a candidate position of specific physical wake-up signaling/a specific physical wake-up channel, the UE does not detect the physical wake-up signaling/channel in the next P paging periods or P subframes or timeslots. Alternatively, if the UE does not detect physical wake-up signaling/a physical wake-up channel at a candidate position of specific physical wake-up signaling/a specific physical wake-up channel, the UE does not detect the physical wake-up signaling/channel in the next P paging periods or P subframes or timeslots. A discontinuous transmission mode and other relevant parameters may be configured for the physical wake-up signaling/channel through system information or UE-specific RRC signaling or MAC signaling or physical layer signaling. For example, the relevant parameters may include parameters such as a discontinuous transmission period of the physical wake-up signaling/channel.

In order to further reduce the power consumption of the UE, UE on the same paging message (PO) may also be divided into several groups, where each group of UE may be distinguished using an orthogonal sequence. In step S220, the detecting the physical wake-up signaling includes: detecting the physical wake-up signaling by using an orthogonal sequence associated with a user group to which the UE belongs, so that the UE decodes only physical wake-up signaling for the user group to which the UE belongs. The orthogonal sequence may be a basic sequence of the physical wake-up signaling/channel. That is, UE on the same PO is grouped using basic sequences of different physical wake-up signaling/channels. Alternatively, the orthogonal sequence may also be a binary sequence, and different binary sequences are applied to the same physical wake-up signaling/channel to distinguish different UE groups on the same PO. In this way, the UE can detect or decode a subsequent paging message only when it detects a physical wake-up signaling/a physical wake-up channel of a sequence corresponding to the UE. The length of the orthogonal sequence depends on the number of available OFDM symbols on the subframes where the physical wake-up signaling/channel is located.

The existing NB-IoT supports three operation modes: a stand-alone operation mode, a guard-band operation mode, and an in-band operation mode. The stand-alone operation mode is to implement NB-IoT in the existing GSM frequency band, that is, using the operating frequency band of an existing GERAN system and a radio frequency band potentially deployed by the IoT. The guard-band operation mode is to implement NB-IoT in the guard band of one LTE carrier, that is, using a frequency band in the LTE frequency band that is used as the guard band. The in-band operation mode is to implement NB-IoT in the existing LTE frequency band, that is, using a frequency band in the LTE frequency band that is used for actual transmission.

For NB-IoT in the stand-alone operation mode and guard-band mode, 14 OFDM symbols on the subframes where the physical wake-up signaling/channel is located all can be used for sending the physical wake-up signaling/channel. For NB-IoT in the in-band mode, according to a predefined or configured start OFDM symbol of the physical wake-up signaling/channel on the subframes where the physical wake-up signaling/channel is located, the number of available ODFM symbols thereof may be 11, 12, or 13. Description is given below using a binary orthogonal sequence having a length of 12 as an example. If different UE on the same PO needs to be divided into $N_{group}$ groups, for example, 4 groups, the UE may be distinguished using the sequences shown in Table 5.

TABLE 5

| Sequence index | Orthogonal sequence |
|---|---|
| 0 | [+1 +1 +1 +1 +1 +1 +1 +1 +1 +1 +1  1] |
| 1 | [+1 +1 +1 +1 +1 +1 −1 −1 −1 −1 −1 −1] |
| 2 | [+1 +1 +1 −1 −1 −1 +1 +1 +1 −1 −1 −1] |
| 3 | [−1 −1 −1 +1 +1 +1 −1 −1 −1 +1 +1 +1] |

Alternatively, users may be grouped by means of FDM or TDM. For example, for FDM, 12 subcarriers on one carrier may be divided into $N_{group}$ groups, each group of different subcarriers representing a different user group. For MTC, 6 physical resource blocks (PRBs) on one narrowband may be divided into $N_{group}$ groups, each group of different PRBs representing a different user group. For TDM, available OFDM symbols on one subframe may be divided into $N_{group}$ groups, each group of different OFDM symbols representing a different user group; or subframes in a specific region in the time domain are divided into $N_{group}$ groups, Each group of different subframes representing a different user group.

Group numbers or sequence index numbers of different UE on the same PO may be obtained from equation (6):

$$\text{group number or sequence index number} = \text{UE\_ID} \mod N_{group} \quad (6)$$

Alternatively, UE may be grouped according to coverage enhancement levels of the UE, and the number of repetitions of physical wake-up signaling/a physical wake-up channel may be configured separately for UE of each coverage enhancement level. The configuration may be unified configuration based on all carriers (anchor carriers and non-anchor carriers) carrying a paging message, or may be separate configuration for each carrier (an anchor carrier and a non-anchor carrier) carrying a paging message. The coverage enhancement level of the UE may be divided based on reference signal received power (RSRP) of the UE, or may be a coverage enhancement level used when the UE communicates with the base station last time, or may be determined by the number of NPDCCH repetitions used when the UE successfully receives a paging message last time. To ensure that the UE and the base station have the same knowledge about the coverage enhancement level of the UE, the UE may inform the base station of the coverage enhancement level of the UE. Or the base station informs the UE of the coverage enhancement level of the UE that is stored by a network side, for example, a mobility management entity (MME). Alternatively, information may be added on the physical wake-up signaling/channel to indicate whether a subsequent NPDCCH is direct indication information. The direct indication information indicates update of system information, and reference may be made to the non-patent literature 3GPP TS 36.212 V14.3.0 (2017-06) for details. For example, different sequences and/or time-domain resources (for example, different OFDM symbols in the same subframe), and/or frequency-domain resources (for example, different subcarriers or PRBs) are used to indicate whether a subsequent NPDCCH is direct indication information, and if the subsequent NPDCCH is direct indication information, the UE does not receive a subsequent paging message, but enters a sleep state or receives update of system information.

In step S210, the determining a time-domain position further includes: determining a start orthogonal frequency division multiplexing (OFDM) symbol for the physical wake-up signaling in each subframe for the physical wake-up signaling, where the start OFDM symbol is predefined or configured by the base station through signaling.

Specifically, the start OFDM symbol for the physical wake-up signaling/channel on the subframes where the physical wake-up signaling/channel is located may be determined in the following manner.

For example, the start OFDM symbol $1_{WUSStart}$ for the physical wake-up signaling/channel on the subframes where the physical wake-up signaling/channel is located is predefined. For example, for NB-IoT in the in-band mode, that is, when the operation mode operationModeInfo configured by the high layer is '00' or '01,' the start OFDM symbol $1_{WUSStart}$ is 2. However, for NB-IoT in the stand-alone mode and guard-band mode, that is, when the operation mode operationModeInfo configured by the high layer is '10' or '11,' the start OFDM symbol $1_{WUSStart}$ is 0.

Alternatively, the start OFDM symbol $1_{WUSStart}$ for the physical wake-up signaling/channel on the subframes where the physical wake-up signaling/channel is located is configured through system information or UE-specific RRC signaling or MAC signaling or physical layer signaling. For example, the start OFDM symbol $1_{WUSStart}$ for the physical wake-up signaling/channel on the subframes where the physical wake-up signaling/channel is located is determined by the value of a control region size eutraControlRegionSize configured on the subframes. If the value of the control region size eutraControlRegionSize is configured, $1_{WUSStart}$ is determined by eutraControlRegionSize; otherwise, the start OFDM symbol $1_{WUSStart}$ for the physical wake-up signaling/channel on the subframes where the physical wake-up signaling/channel is located is equal to 0.

Figure 3:
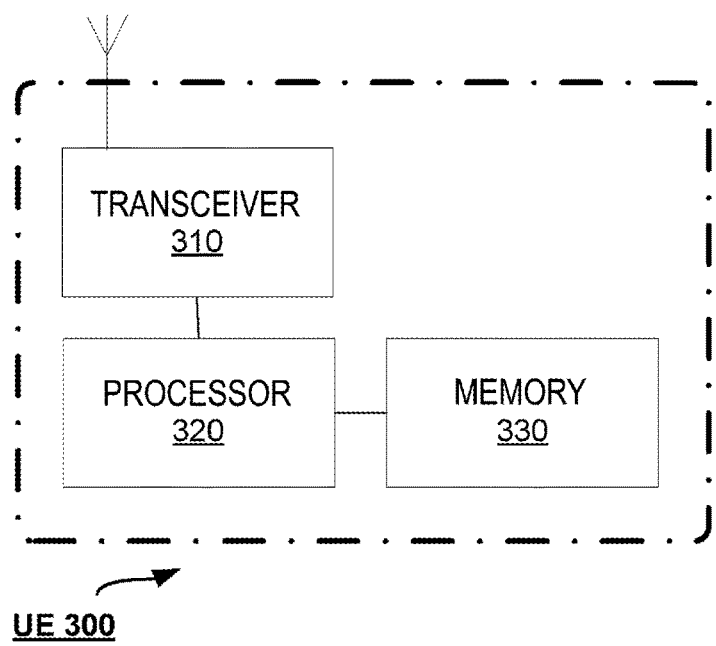
FIG. 3 is a block diagram of user equipment according to an embodiment of the present application.

In accordance with the method 200 described above, the present disclosure provides user equipment (UE). FIG. 3 is a block diagram of UE 300 according to an embodiment of the present disclosure. As shown in the figure, the UE 300 includes a transceiver 310, a processor 320, and a memory 330, the processor 330 storing instructions executable by the processor 320 so that the user equipment 300 performs the method 200 described above with reference to FIG. 2.

Specifically, the processor 330 stores instructions executable by the processor 320, so that the user equipment 300 determines a time-domain position of physical wake-up signaling, the physical wake-up signaling being used for waking up the UE to detect a subsequent narrowband physical downlink control channel (NPDCCH); and detects the physical wake-up signaling from a base station at the determined time-domain position. The determining a time-domain position includes: determining a start subframe or an end subframe for the physical wake-up signaling and the number of subframes for the physical wake-up signaling.

In an embodiment, a first offset exists between the end subframe and a subsequent paging occasion, and the time-domain position comprises the number of consecutive available subframes ending with the end subframe; or a second offset exists between the start subframe and a subsequent paging occasion, and the time-domain position comprises the number of consecutive available subframes starting with the start subframe; or the start subframe is determined by a period of the physical wake-up signaling and a third offset, and the time-domain position comprises the number of consecutive available subframes starting with the start subframe, where the first offset, the second offset, the period, and the third offset are predetermined or configured by the base station through signaling, and the number is configured for a paging carrier by the base station through radio resource control (RRC) signaling, or derived according to a maximum number of repetitions, configured for a paging carrier, of an NPDCCH scrambled by a paging radio network temporary identity (P-RNTI).

In an embodiment, the determining a time-domain position further includes: determining a start orthogonal frequency division multiplexing (OFDM) symbol for the physical wake-up signaling in each subframe for the physical wake-up signaling, where the start OFDM symbol is predefined or configured by the base station through signaling.

In an embodiment, the detecting the physical wake-up signaling includes: detecting the physical wake-up signaling by using an orthogonal sequence associated with a user group to which the UE belongs, so that the UE decodes only physical wake-up signaling for the user group to which the UE belongs.

Figure 4:
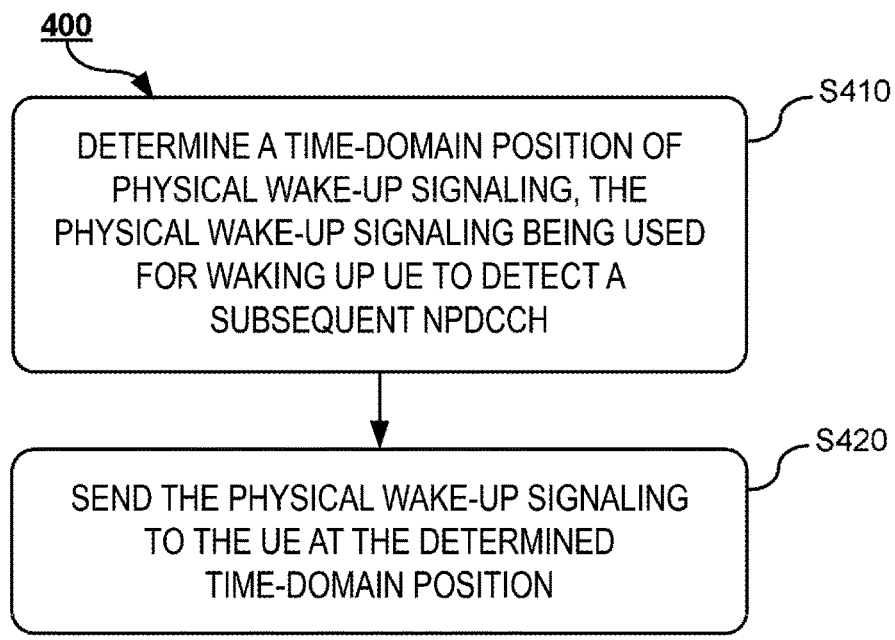
FIG. 4 is a flowchart of a method used in a base station according to an embodiment of the present disclosure.

The present disclosure further provides a method used in a base station. FIG. 4 is a flowchart of a method 400 used in a base station according to an embodiment of the present disclosure. As shown in the figure, the method 400 includes the following steps.

Step S410: Determine a time-domain position of physical wake-up signaling, the physical wake-up signaling being used for waking up user equipment (UE) to detect a subsequent narrowband physical downlink control channel (NPDCCH). The determining a time-domain position includes: determining a start subframe or an end subframe for the physical wake-up signaling and the number of subframes for the physical wake-up signaling.

Step S420: Send the physical wake-up signaling to the UE at the determined time-domain position.

In an embodiment, a first offset exists between the end subframe and a subsequent paging occasion, and the time-domain position includes the number of consecutive available subframes ending with the end subframe; or a second offset exists between the start subframe and a subsequent paging occasion, and the time-domain position includes the number of consecutive available subframes starting with the start subframe; or the start subframe is determined by a period of the physical wake-up signaling and a third offset, and the time-domain position includes the number of consecutive available subframes starting with the start subframe, where the first offset, the second offset, the period, and the third offset are predetermined or configured for the UE through signaling, and the number is configured for a paging carrier for the UE through radio resource control (RRC) signaling, or derived according to a maximum number of repetitions, configured for a paging carrier, of an NPDCCH scrambled by a paging radio network temporary identity (P-RNTI).

In an embodiment, the determining a time-domain position further includes: determining a start orthogonal frequency division multiplexing (OFDM) symbol for the physical wake-up signaling in each subframe for the physical wake-up signaling, where the start OFDM symbol is predefined or configured for the UE through signaling.

In an embodiment, the sending the physical wake-up signaling includes: applying an orthogonal sequence associated with a user group to which the UE belongs to the physical wake-up signaling.

Figure 5:
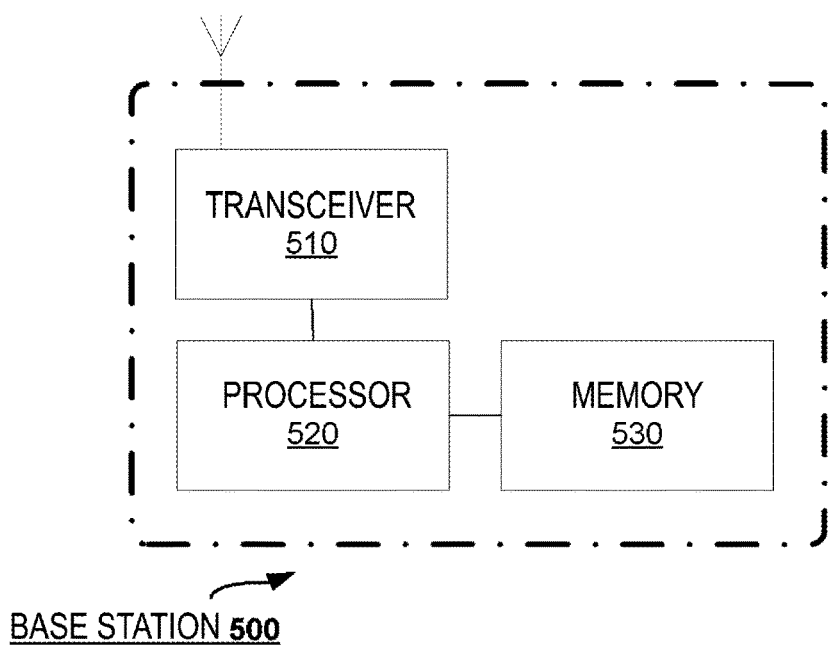
FIG. 5 is a block diagram of a base station according to an embodiment of the present application.

In accordance with the method 400 described above, the present disclosure provides a base station. FIG. 5 is a block diagram of a base station 500 according to an embodiment of the present disclosure. As shown in the figure, the base station 500 includes a transceiver 510, a processor 520, and a memory 530, the processor 530 storing instructions executable by the processor 520 so that the base station 500 performs the method 400 described above with reference to FIG. 4.

Specifically, the processor 530 stores instructions executable by the processor 520, so that the base station 500 determines a time-domain position of physical wake-up signaling, the physical wake-up signaling being used for waking up user equipment (UE) to detect a subsequent narrowband physical downlink control channel (NPDCCH); and sends the physical wake-up signaling to the UE at the determined time-domain position, where the determining a time-domain position includes: determining a start subframe or an end subframe for the physical wake-up signaling and the number of subframes for the physical wake-up signaling.

In an embodiment, a first offset exists between the end subframe and a subsequent paging occasion, and the time-domain position includes the number of consecutive available subframes ending with the end subframe; or a second offset exists between the start subframe and a subsequent paging occasion, and the time-domain position includes the number of consecutive available subframes starting with the start subframe; or the start subframe is determined by a period of the physical wake-up signaling and a third offset, and the time-domain position includes the number of consecutive available subframes starting with the start subframe, where the first offset, the second offset, the period, and the third offset are predetermined or configured for the UE through signaling, and the number is configured for a paging carrier for the UE through radio resource control (RRC) signaling, or derived according to a maximum number of repetitions, configured for a paging carrier, of an NPDCCH scrambled by a paging radio network temporary identity (P-RNTI).

In an embodiment, the determining a time-domain position further includes: determining a start orthogonal frequency division multiplexing (OFDM) symbol for the physical wake-up signaling in each subframe for the physical wake-up signaling, where the start OFDM symbol is predefined or configured for the UE through signaling.

In an embodiment, the sending the physical wake-up signaling includes: applying an orthogonal sequence associated with a user group to which the UE belongs to the physical wake-up signaling.

Accordingly, all the examples and features described above with respect to the method 200 and any combination thereof are also applicable to the UE 300, the method 400, and the base station 500.

The methods and related devices according to the present application have been described above in conjunction with the preferred embodiments. It should be understood by those skilled in the art that the methods shown above are only exemplary. The method according to the present application is not limited to steps or sequences shown above. The network node and user equipment shown above may include more modules; for example, the network node and user equipment may further include modules that can be developed or developed in the future to be applied to a base station or UE, and the like. Various identifiers shown above are only exemplary rather than limitative. The present application is not limited to specific information elements serving as examples of these identifiers. Those skilled in the art can make various alterations and modifications according to the teachings of the illustrated embodiments.

It should be understood that the above-described embodiments of the present application may be implemented through software, hardware, or a combination of software and hardware. For example, various components of the base station and user equipment in the above embodiments can be implemented through multiple devices, and these devices include, but are not limited to: an analog circuit device, a digital circuit device, a digital signal processing (DSP) circuit, a programmable processor, an application specific integrated circuit (ASIC), a field programmable gate array (FPGA), a programmable logic device (CPLD), and the like.

In the present application, the "base station" refers to a mobile communication data and control switching center with large transmit power and wide coverage area, including resource allocation scheduling, and data receiving and transmitting functions. The "user equipment" refers to a user mobile terminal, such as a terminal device that can perform wireless communication with a base station or a micro base station, including a mobile phone, a notebook, or the like.

In addition, the embodiments of the present application disclosed herein may be implemented on a computer program product. More specifically, the computer program product is a product provided with a computer-readable medium having computer program logic encoded thereon. The computer program logic, when executed on a computing device, provides related operations to implement the above-described technical solutions of the present application. The computer program logic, when executed on at least one processor of a computing system, causes the processor to perform the operations (methods) described in the embodiments of the present application. Such an arrangement of the present application is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared databases and so on in one or more modules. Software or firmware or such configuration may be installed on a computing device such that one or more processors in the computing device perform the technical solutions described in the embodiments of the present application.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor; or the processor may be an existing processor, a controller, a microcontroller, or a state machine. The above-mentioned general-purpose processor or each circuit may be configured with a digital circuit or may be configured with a logic circuit. In addition, when an advanced technology that can replace current integrated circuits emerges because of the advances in semiconductor technology, the present application may also use integrated circuits obtained using this advanced technology.

Although the present application has been shown above in connection with the preferred embodiments of the present application, it will be understood by those skilled in the art that various modifications, substitutions and alterations may be made to the present application without departing from the spirit and scope of the present application. Accordingly, the present application should not be defined by the above-described embodiments, but should be defined by the appended claims and their equivalents.

The program running on the device according to the present invention may be a program that enables the computer to implement the functions of the embodiments of the present invention by controlling a central processing unit (CPU). The program or information processed by the program can be stored temporarily in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, the present invention may also be implemented using these new integrated circuit technologies.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A user equipment (UE), comprising:
   a detection unit configured to detect a wake-up signaling (WUS) transmitted by a base station within a WUS duration, the WUS being a signal for causing the UE to monitor a paging occasion (PO) for detecting a paging message;
   a determination unit configured to, when the UE detects the WUS within the WUS duration, determine the PO based on a time-offset; and
   a monitoring unit configured to monitor the PO for detecting the paging message, wherein:
   the PO follows the WUS duration in a time-domain position and the time-offset is in subframes between an end of the WUS duration and a start of the PO,
   the WUS duration starts in a specific subframe,
   the WUS duration is a number of subframes, and
   the time-offset is configured by system information, which is transmitted from the base station to the UE.

2. The UE of claim 1, wherein the WUS duration is derived by a maximum number of repetitions fora Narrowband Physical Downlink Control channel (NPDCCH) for paging.

3. The UE of claim 1, wherein one or more POs are configured for the WUS by the system information.

4. The UE of claim 1, wherein the WUS and the PO are on a same Narrowband Internet of Things (NB-IoT) carrier.

5. A base station, comprising:
   a transmission unit configured to transmit a wake-up signaling (WUS) within a WUS duration to a user equipment (UE), the WUS being a signal for causing the UE to monitor a paging occasion (PO) for detecting a paging message; and
   a determination unit configured to determine the PO based on a time-offset, wherein:
   the PO follows the WUS duration in a time-domain position and the time-offset is in subframes between an end of the WUS duration and a start of the PO,
   the WUS duration starts in a specific subframe,
   the WUS duration is a number of subframes, and
   the time-offset is configured by system information, which is transmitted from the base station to the UE.

6. The base station of claim 5, wherein the WUS duration is derived by a maximum number of repetitions fora Narrowband Physical Downlink Control channel (NPDCCH) for paging.

7. The base station of claim 5, wherein one or more POs are configured for the WUS by the system information.

8. The base station of claim 5, wherein the WUS and the PO are on a same Narrowband Internet of Things (NB-IoT) carrier.

9. A method performed by a user equipment (UE), the method comprising:
   detecting a wake-up signaling (WUS) transmitted by a base station within a WUS duration, the WUS being a signal for causing the UE to monitor a paging occasion (PO) for detecting a paging message;
   when the UE detects the WUS within the WUS duration, determining the PO based on a time-offset; and
   monitoring the PO for detecting the paging message, wherein:
   the PO follows the WUS duration in a time-domain position and the time-offset is in subframes between an end of the WUS duration and a start of the PO,
   the WUS duration starts in a specific subframe,
   the WUS duration is a number of subframes, and
   the time-offset is configured by system information, which is transmitted from the base station to the UE.

10. The method of claim 9, wherein the WUS duration is derived by a maximum number of repetitions for a Narrowband Physical Downlink Control channel (NPDCCH) for paging.

11. The method of claim 9, wherein one or more POs are configured for the WUS by the system information.

12. The method of claim 9, wherein the WUS and the PO are on a same Narrowband Internet of Things (NB-IoT) carrier.

* * * * *